US005808219A

United States Patent [19]

Usa

[11] Patent Number: 5,808,219

[45] Date of Patent: Sep. 15, 1998

[54] MOTION DISCRIMINATION METHOD AND DEVICE USING A HIDDEN MARKOV MODEL

[75] Inventor: Satoshi Usa, Hamamatsu, Japan

[73] Assignee: Yamaha Corporation, Japan

[21] Appl. No.: 742,346

[22] Filed: Nov. 1, 1996

[30] Foreign Application Priority Data

Nov. 2, 1995 [JP] Japan .................................... 7-285774

[51] Int. Cl.[6] ..................................................... G09B 15/02

[52] U.S. Cl. ........................................... 84/600; 811/477 B

[58] Field of Search ................................. 84/477 B, 600, 84/723; 382/103, 155, 228; 395/93, 97

[56] References Cited

U.S. PATENT DOCUMENTS

| | | | |
|---|---|---|---|
| 4,341,140 | 7/1982 | Ishida . | |
| 5,177,311 | 1/1993 | Suzuki et al. | 84/600 |
| 5,192,823 | 3/1993 | Suzuki et al. | 84/600 |
| 5,454,043 | 9/1995 | Freeman . | |
| 5,521,324 | 5/1996 | Dannenberg et al. . | |
| 5,526,444 | 6/1996 | Kopec et al. . | |
| 5,585,584 | 12/1996 | Usa | 84/600 |
| 5,644,652 | 7/1997 | Bellegarda et al. | 382/126 |
| 5,648,627 | 7/1997 | Usa | 84/600 |

OTHER PUBLICATIONS

"An Introduction to Hidden Markov Models", IEEE ASSP Magazine, Jan. 1986, pp. 4–16.

"Speech Recognition Using Markov Models", by Masaaki Oko–Chi, IBM Japan Ltd., Tokyo, Apr. 1987, vol. 70, No. 4, pp. 352–358.

"Recognizing Human Action in Time–Sequential Images Using Hidden Markov Models", t Yamato, et al., Journal of Articles of the Electronic Information Telecommunications Society of Japan, Dec. 1993, pp. 2556–2563.

"Human Action Recognition Using HMM with Category––Separated Vector Quantization", Journal of Articles of the Electronic Information Telecommunication Society of Japan, Jul. 1994, pp. 1311–1318.

*Primary Examiner*—William M. Shoop, Jr.
*Assistant Examiner*—Jeffrey W. Donels
*Attorney, Agent, or Firm*—Graham & James LLP

[57] ABSTRACT

A motion discrimination method or a motion discrimination device is provided to discriminate a kind of a motion, i.e., one of conducting operations which are made by a human operator by swinging a baton to conduct music of a certain time (e.g., quadruple time). Herein, sensors are provided to detect the motion, made by the human operator, to produce detection values. The detection values are converted to operation labels, which are assembled together in a certain time unit (e.g., 10 ms) to form label series. In addition, there are provided a plurality of Hidden Markov Models, each of which is constructed to learn label series corresponding to a specific motion in advance. Calculations are performed to produce probabilities that multiple Hidden Markov Models respectively output the label series corresponding to the detected motion. Then, a kind of the motion is discriminated on the basis of result of the calculations. Further, a beat label representing the discriminated kind of the motion is inserted into the label series. Herein, the discrimination is made only when a highest one of the probabilities exceeds a certain threshold value so that designation of a beat is detected. Incidentally, the discriminated kind of the motion is used as a detected beat, designated by the human operator, by which a tempo of automatic performance is controlled.

22 Claims, 12 Drawing Sheets

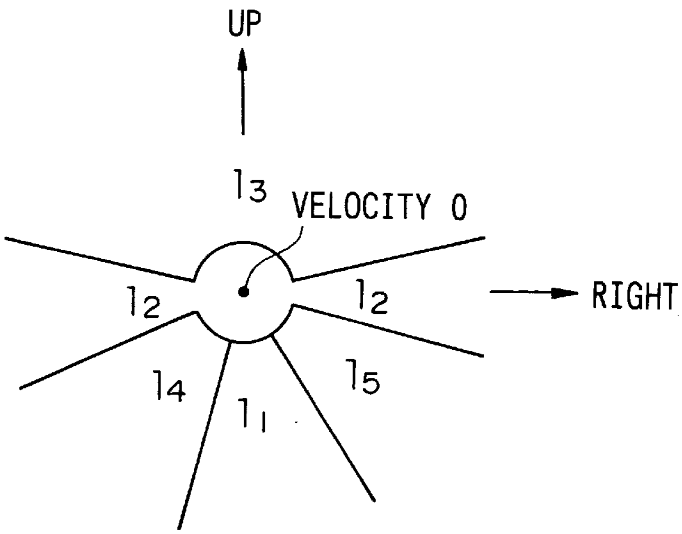

FIG.6A $l_1$: SWING-DOWN FROM UPPER POSITION TO LOWER POSITION $l_2$: VELOCITY ZERO IN VERTICAL DIRECTION $l_3$: SWING-UP $l_4$: SWING-DOWN FROM UPPER-RIGHT POSITION TO LOWER-LEFT POSITION $l_5$: SWING-DOWN FROM UPPER-LEFT POSITION TO LOWER-RIGHT POSITION $l_6$: FIRST BEAT OF QUADRUPLE TIME $l_7$: SECOND BEAT OF QUADRUPLE TIME $l_8$: THIRD BEAT OF QUADRUPLE TIME $l_9$: FOURTH BEAT OF QUADRUPLE TIME $l_{10}$: FIRST BEAT OF TRIPLE TIME $l_{11}$: SECOND BEAT OF TRIPLE TIME $l_{12}$: THIRD BEAT OF TRIPLE TIME $l_{13}$: FIRST BEAT OF DUPLE TIME $l_{14}$: SECOND BEAT OF DUPLE TIME, ETC.

FIG.6B $M_{41}$: FIRST BEAT OF QUADRUPLE TIME
$M_{42}$: SECOND BEAT OF QUADRUPLE TIME
$M_{43}$: THIRD BEAT OF QUADRUPLE TIME
$M_{44}$: FOURTH BEAT OF QUADRUPLE TIME
$M_{31}$: FIRST BEAT OF TRIPLE TIME
$M_{32}$: SECOND BEAT OF TRIPLE TIME
$M_{33}$: THIRD BEAT OF TRIPLE TIME
$M_{21}$: FIRST BEAT OF DUPLE TIME
$M_{22}$: SECOND BEAT OF DUPLE TIME $l_1$: SWING A HAND ABOUT $l_2$: START STRETCHING AN ELBOW $l_3$: START BENDING AN ELBOW $l_4$: AN ELBOW IS COMPLETELY STRETCHED $l_5$: AN ELBOW IS COMPLETELY BENT $l_6$: START SPREADING OUT ARMS $l_7$: START NARROWING ARMS $l_8$: CLASP A HAND $l_9$: SPREAD A HAND $l_{10}$: START PUTTING A HAND UP $l_{11}$: START PUTTING A HAND DOWN $l_{12}$: START BENDING A WRIST $l_{13}$: START STRETCHING A WRIST, ETC.

FIG.8A $HMM_1$: PUNCH (HIGH PROBABILITY IN LABEL SERIES OF $l_8, l_2, l_2, l_4, l_4$, ETC., FOR EXAMPLE)

$HMM_2$: ENERGY-CHARGE OPERATION (HIGH PROBABILITY IN LABEL SERIES OF $l_8, l_4, l_1, l_1, l_1$, ETC., FOR EXAMPLE)

$HMM_3$: SPACEWALK BY BREASTSTROKE (HIGH PROBABILITY IN LABEL SERIES OF $l_4, l_6, l_6, l_6, l_3, l_3, l_2, l_2, l_4, l_6$, ETC., FOR EXAMPLE)

$HMM_4$: SPACEWALK BY CRAWL (HIGH PROBABILITY IN LABEL SERIES OF $l_4, l_9, l_1, l_1, l_1$, ETC., FOR EXAMPLE)

ETC.

FIG.8B

FIG.9A $l_1$: PLACE A HAND AT HEIGHT NEAR BELLY $l_2$: START RAISING A HAND FROM HEIGHT NEAR BELLY TO HEIGHT NEAR BREAST $l_3$: START LOWERING A HAND FROM HEIGHT NEAR BREAST TO HEIGHT NEAR BELLY $l_4$: START RAISING A HAND FROM HEIGHT NEAR BREAST TO HEIGHT NEAR FACE $l_5$: START LOWERING A HAND FROM HEIGHT NEAR FACE TO HEIGHT HEAR BREAST $l_6$: SMALL ROTATION OF A HAND AT HEIGHT NEAR BREAST $l_7$: SUBSTANTIALLY NO CHANGE IN HEIGHT OF A HAND $l_8$: START MOVING A HAND FROM RIGHT TO LEFT $l_9$: START MOVING A HAND FROM LEFT TO RIGHT $l_{10}$: SUBSTANTIALLY NO CHANGE IN POSITION OF A HAND IN RIGHT-LEFT DIRECTIONS

ETC.

FIG.9B $HMM_1$: BROTHER (HIGH PROBABILITY IN LABEL SERIES OF $l_1, l_2, l_2, l_{10}, l_7, l_4, l_4, l_4, l_7, l_7, l_5, l_5, l_3, l_3, l_1, l_1$, ETC., FOR EXAMPLE)

$HMM_2$: SERIOUS (HIGH PROBABILITY IN LABEL SERIES OF $l_1, l_2, l_8, l_2, l_8, l_2, l_7, l_9, l_9, l_9, l_4, l_4, l_8, l_4, l_1$, ETC., FOR EXAMPLE)

$HMM_3$: SUGAR (HIGH PROBABILITY IN LABEL SERIES OF $l_1, l_2, l_2, l_6, l_6, l_6, l_6, l_6, l_6, l_3, l_3, l_3, l_1$, ETC., FOR EXAMPLE)

ETC.

MOTION DISCRIMINATION METHOD AND DEVICE USING A HIDDEN MARKOV MODEL

BACKGROUND OF THE INVENTION

1. Field of the Invention

The invention relates to motion discrimination methods and devices which discriminate kinds of motions made by a human operator, such as conducting operations which are made to conduct the music using an electronic musical apparatus.

2. Prior Art

The electronic musical apparatuses indicates electronic musical instruments, sequencers, automatic performance apparatuses, sound source modules and karaoke systems as well as personal computers, general-use computer systems, game devices and any other information processing apparatuses which are capable of processing music information in accordance with programs, algorithms and the like.

Conventionally, there are provided a variety of methods and devices which are designed to discriminate kinds of human motions. In general, those methods are designed to use simple signal processing corresponding to filtering processes and big/small comparison processes; or the methods are designed to make analysis on angles and angle differences of two-dimensional motion signals.

In general, however, the human motions are obscure and unstable. Therefore, the conventional methods, using the simple signal processing only, have a low precision in detection and discrimination of the human motions, so the reliability thereof should be relatively low. For this reason, the conventional methods suffer from a problem that detection errors and discrimination errors frequently occur.

So, if the conventional methods are used to control a tempo of the music and dynamics of the music, there should occur disadvantages as follows:

(1) Because of an extremely low recognition rate of recognition of conducting operations, it is required for a human operator (i.e., user) to be accustomed to a set of motions which the machine can recognize with ease. So, much time is required for the user to be accustomed to the system.

(2) The machine may cause error response which is different from an intended operation which the user intends to designate, so recognition errors may frequently occur. Because of the occurrence of the recognition errors, it is difficult for the user to play music performance in a stable manner.

SUMMARY OF THE INVENTION

It is an object of the invention to provide a motion discrimination method and a device which are improved in precision and reliability for detection and discrimination of human motions such as conducting operations.

The motion discrimination method (and device) is designed to discriminate the human motions using a hidden Markov model (abbreviated by 'HMM'). Specifically, sensor outputs corresponding to human motions are subjected to vector quantization to produce label series. So, kinds of the human motions are discriminated by calculating probabilities that the hidden Markov model outputs the label series.

According to the invention, a motion discrimination method or a motion discrimination device is provided to discriminate a kind of a motion, i.e., one of conducting operations which are made by a human operator by swinging a baton to conduct music of a certain time (e.g., quadruple time). Herein, sensors are provided to detect the motion, made by the human operator, to produce detection values. The detection values are converted to operation labels, which are assembled together in a certain time unit (e.g., 10ms) to form label series. In addition, there are provided a plurality of Hidden Markov Models, each of which is constructed to learn label series corresponding to a specific motion in advance. For example, the Hidden Markov Models are constructed to learn label series respectively corresponding to first, second, third and fourth beats of quadruple time in accordance with a certain method of performance (e.g., legato, staccato, etc.).

Now, calculations are performed to produce probabilities that multiple Hidden Markov Models respectively output the label series corresponding to the detected motion. Then, a kind of the motion is discriminated on the basis of result of the calculations. Further, a beat label representing the discriminated kind of the motion is inserted into the label series. Herein, the discrimination is made only when a highest one of the probabilities exceeds a certain threshold value so that designation of a beat is detected. Incidentally, the discriminated kind of the motion is used as a detected beat, designated by the human operator, by which a tempo of automatic performance is controlled.

BRIEF DESCRIPTION OF THE DRAWINGS

These and other objects of the subject invention will become more fully apparent as the following description is read in light of the attached drawings wherein:

FIG. 6A is a drawing showing partitions used to analyze motions of a baton;

FIG. 6B shows an example of a label list indicating labels which relate to recognition of conducting operations;

FIG. 8A shows an example of a label list indicating labels which relate to recognition of human motions regarding a game;

FIG. 8B shows a list of HMMs which are used to recognize the human motions regarding the game;

FIG. 9A shows an example of a label list indicating labels which relate to recognition of sign language;

FIG. 9B shows a list of HMMs which are used to recognize sign language; and

DESCRIPTION OF THE PREFERRED EMBODIMENT

Now, the content of a hidden Markov model (i.e., 'HMM[\']) which is used by an embodiment of this invention will be explained with reference to FIG. 1 which is a state transition diagram showing an example of a system of the HMM. The HMM is designed to output a variety of label series with their probabilities. In addition, the HMM has 'N' states which are respectively designated by symbols S. $S_2$, . . . , SN where 'N' is an integer. Herein, a state transition from one state to another occurs by a certain period. The HMM outputs one label at each state-transition event. A decision as to which state the system of the HMM changes to at a next time depends on a 'transition probability', whilst a decision as to what kind of the label the system of the HMM outputs depends on an 'output probability'.

Figure 1:
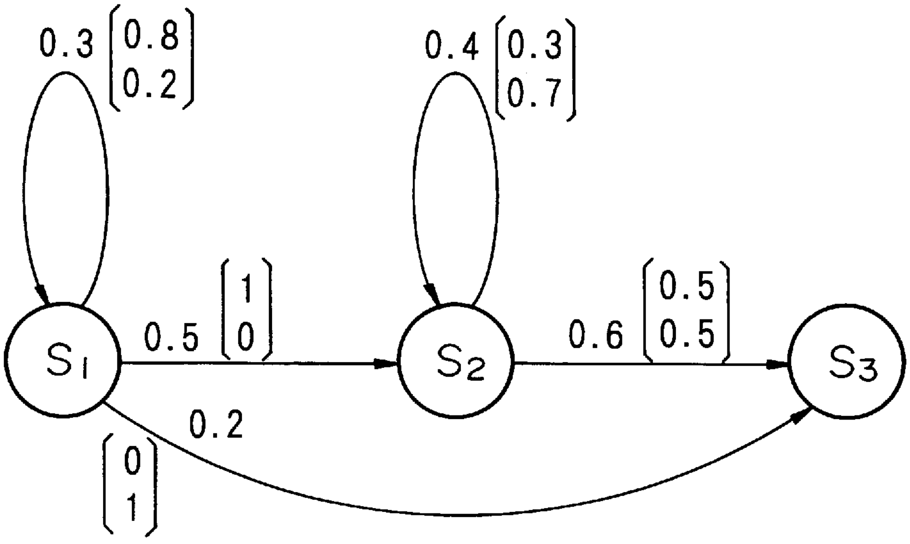
FIG. 1 is a state transition diagram showing an example of a simple structure of a HMM.

The system of the HMM shown in FIG. 1 is constructed by 3 states $S_1$, $S_2$ and $S_3$, wherein the HMM is designed to output label series consisting of two kinds of labels 'a' and 'b'. Herein, an upper value in parenthesis '[]' represents a probability value of the label 'a', whilst a lower value represents a probability value of the label 'b'. As for an initial state Si, a self state transition occurs with a probability of 0.3. In other words, the system remains at the initial state $S_1$ with the probability of 0.3. In such a self transition event, the HMM outputs the label 'a' with a probability of 0.8, or the HMM outputs the label 'b' with a probability of 0.2. A state transition from the state S to the state $S_2$ occurs with a probability of 0.5. In such a state transition event, the HMM normally outputs the label 'a'. A state transition from the state $S_1$ to a last state $S_3$ occurs with a probability of 0.2. In such a state transition event, the HMM normally outputs the label 'b'. In addition, the system remains at the state $S_2$ with a probability of 0.4. In such a self transition event, the HMM outputs the label 'a' with a probability of 0.3, or the HMM outputs the label 'b' with a probability of 0.7. A state transition from the state $S_2$ to the last state $S_3$ occurs with a probability of 0.6. In such a state transition event, the HMM outputs the label 'a' with a probability of 0.5, or the HMM outputs the label 'b' with a probability of 0.5.

Now, consideration will be made with respect to a probability that the HMM outputs label series consisting of the labels 'a', 'a' and 'b' (hereinafter, simply referred to as label series of 'aab'). Herein, the system of the HMM can present a number of state transition sequences, each consisting of a number of states, with respect to certain label series. In addition, a number of the state transition sequences may be infinite unless a number of state transition events is not limited, because the system of the HMM is capable of repeating the self transition with respect to a certain state. As for the label series of 'aab', it is possible to present only 3 kinds of state transition sequences, i.e., '$S_1S_1S_2S_3$', '$S_1S_2S_2S_3$' and '$S_1S_1S_1S_3$'. Probabilities regarding the 3 kinds of state transition sequences are respectively calculated, as follows:

$$0.3\times0.8\times0.5\times1.0\times0.6\times0.5=0.036$$

$$0.5\times1.0\times0.4\times0.3\times0.6\times0.5=0.018$$

$$0.3\times0.8\times0.3\times0.8\times0.2\times1.0=0.01152$$

Thus, a sum of the probabilities that the HMM outputs the label series of 'aab' is calculated as follows:

$$0.036+0.018+0.01152=0.06552$$

Incidentally, it cannot be detected that by which of the 3 kinds of state transition sequences, the HMM outputs the label series of 'aab'. So, a Markov model regarding such a non-detectable manner is called a 'hidden' Markov model (i.e., HMM). The HMM is conventionally used in speech recognition fields such as the single-word speech recognition.

An example of a speech recognition system is designed such that an input voice is subjected to label process by each frame time which corresponds to several tens of milliseconds, so that label series is produced. Then, an output probability of this label series is calculated with respect to multiple hidden Markov models, each of which performs learning to output pronunciation of a different word. Thus, the speech recognition system makes a recognition that the input voice corresponds to the word outputted from the HMM whose probability is the highest among the probabilities calculated. Such a technology of the speech recognition system is explained in detail by an article, entitled "Speech Recognition Using Markov Models (Masaaki Okouchi)", which is described in pages 352–358 of the April issue of 1987 of the Journal of the Electronic Information Telecommunication Society of Japan.

Figure 2A:
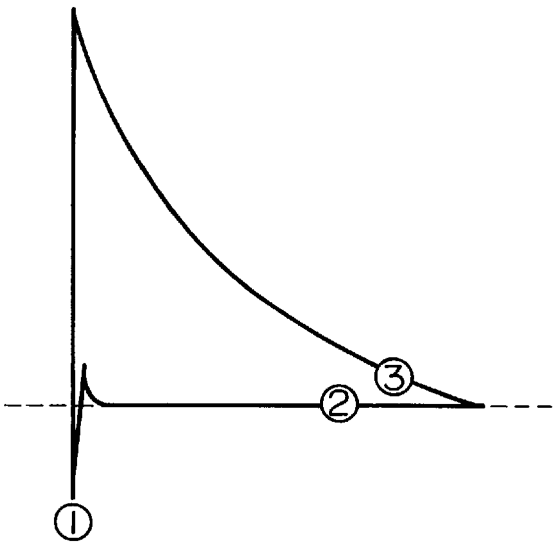
FIGS. 2A, 2B, 2C and 2D are drawings showing examples of a locus of a baton which is moved in accordance with triple time.
Figure 2B:
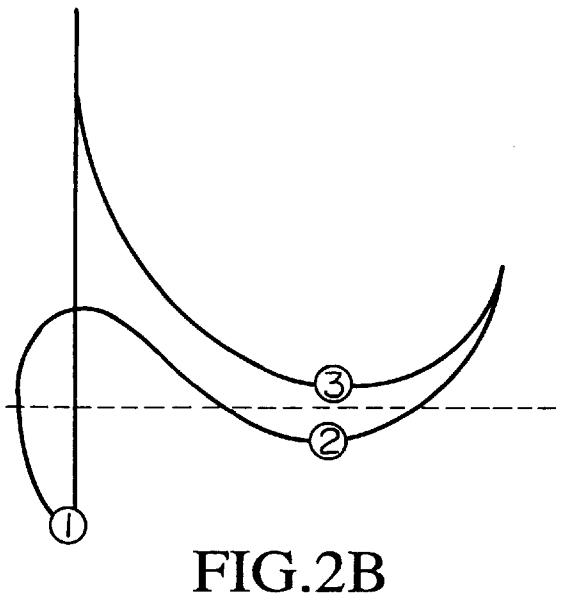
Figure 2C:
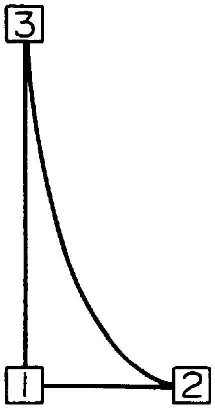
Figure 2D:
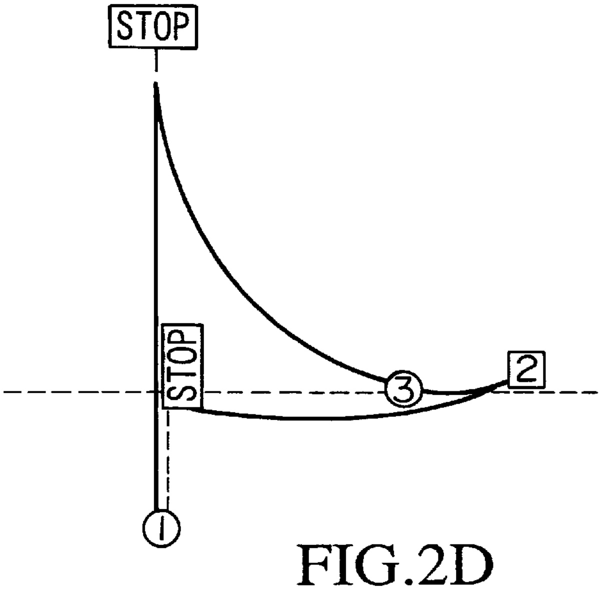

Next, a description will be given with respect to a method to detect and discriminate swing motions of a conducting baton which is swung in accordance with a certain conducting method. This method is realized using the system of the HMM of the present embodiment. FIGS. 2A to 2D each show examples of a locus of a baton with which a conductor the music of triple time. FIGS. 3A to 3D each show examples of a locus of a baton with which a conductor conducts the music of quadruple time. Further, FIGS. 4A to 4D each show examples of a locus of a baton with which a conductor conducts the music of duple time. FIGS. 2A to 2D show different methods of performance respectively. Specifically, the locus of FIG. 2A corresponds to a normal mode (i.e., non legato); the locus of FIG. 2B corresponds to a legato; the locus of FIG. 2C corresponds to weak staccato; and the locus of FIG. 2D corresponds to strong staccato. Those drawings show that a first motion to indicate a first beat in triple time (hereinafter, simple referred to as a 'first beat motion' of triple time) is mainly composed of a swing-down motion by which the conductor swings down the baton from an upper position to a lower position, wherein a lower end of this motion corresponds to a beating point of the first beat. Except the case of the weak staccato of FIG. 2C, the swing-down motion is accompanied with a short swing-up motion which occurs on the rebound thereof. A second motion to indicate a second beat in triple time (hereinafter, simply referred to as a 'second beat motion' of triple time) is a swing motion by which the conductor swings the baton to the right. A location of a beating point of the second beat motion depends on a method of performance. Specifically, the non legato of FIG. 2A and legate of FIG. 2B show that a beating point appears in the middle of the second beat motion, whilst the staccato of FIGS. 2C and 2D shows that a beating point is placed at a right end of the second beat motion. Next, a third motion to indicate a third beat in triple time (hereinafter, simply referred to as a 'third beat motion' of triple time) is a swing-up motion by which the conductor swings up the baton from a lower right position to an upper left position. Herein, the weak staccato of FIG. 2C shows that a beating point is placed at an end position of the third beat motion (i.e., a start position of the first beat motion). Except the case of the weak staccato of FIG. 2C, a beating point appears in the middle of the third beat motion. Incidentally, numbers of beats (i.e., 1, 2, 3), each accompanied with circles, indicate beating points through which the baton passes at a certain speed or at which a swing direction of the baton is folded back. In addition, numbers of beats, each accompanied with squares, indicate beating points at which the baton is stopped.

Figure 3A:
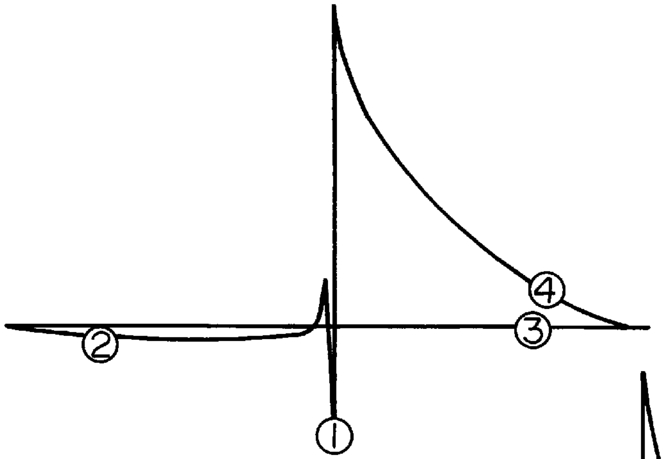
FIGS. 3A, 3B, 3C and 3D are drawings showing examples of a locus of a baton which is moved in accordance with quadruple time.
Figure 3B:
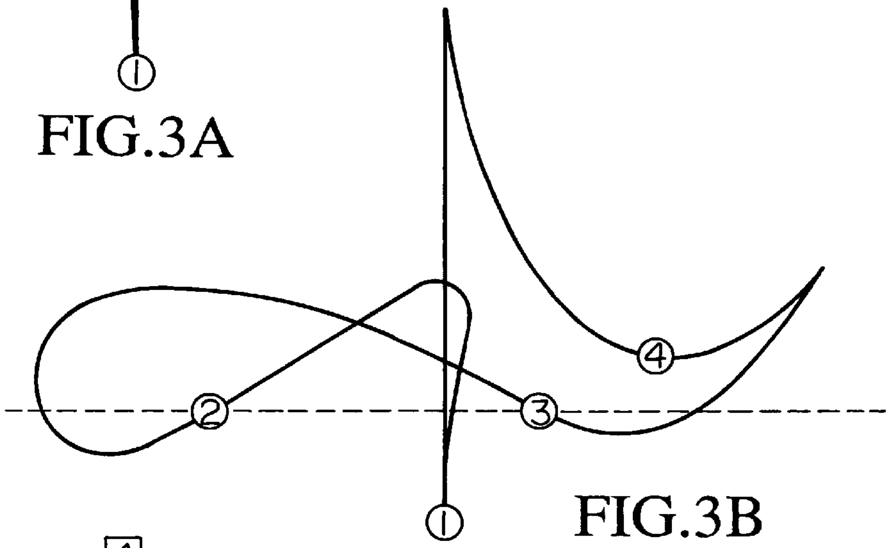
Figure 3C:
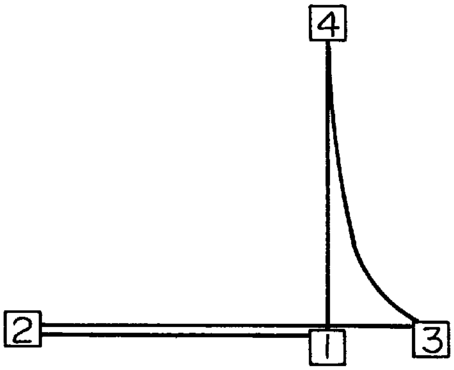
Figure 3D:
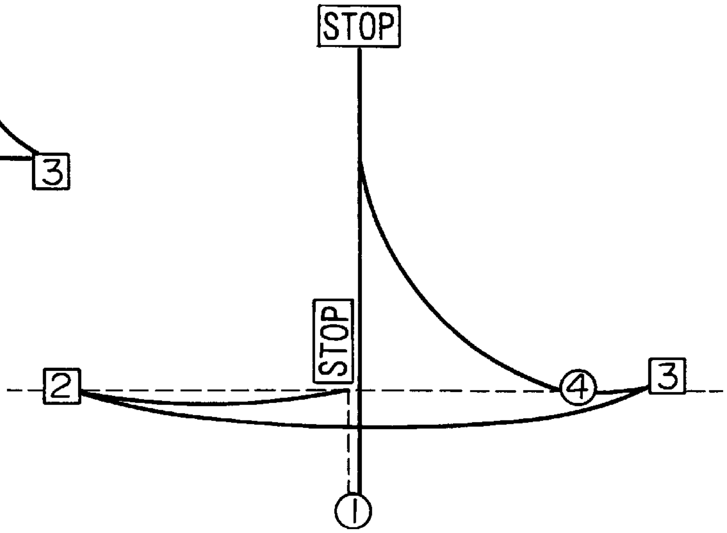
Figure 4A:
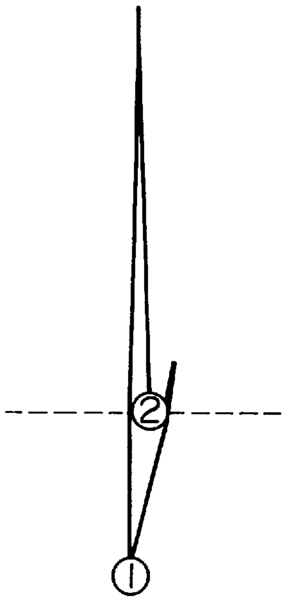
FIGS. 4A, 4B, 4C and 4D are drawings showing examples of a locus of a baton which is moved in accordance with duple time.
Figure 4B:
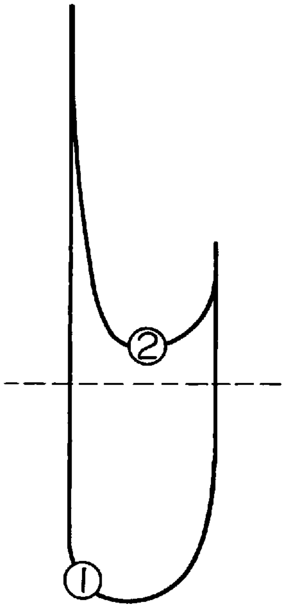
Figure 4C:
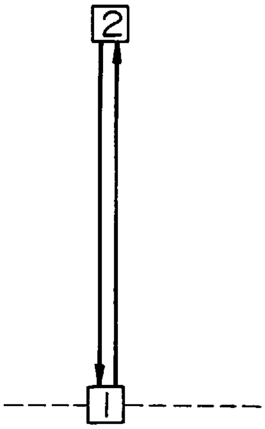
Figure 4D:
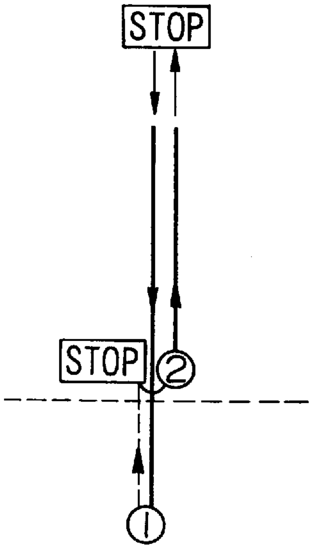

Like FIGS. 2A to 2D, FIGS. 3A to 3D show different methods of performance respectively. Specifically, the locus of FIG. 3A corresponds to a normal mode (i.e., non legato); the locus of FIG. 3B corresponds to legato; the locus of FIG. 3C corresponds to weak staccato; and the locus of FIG. 3D corresponds to strong staccato. A conducting method of quadruple time is similar to a conducting method of triple time. Roughly speaking, a first beat motion of quadruple time corresponds to the first beat motion of triple time; a third beat motion of quadruple time corresponds to the second beat motion of triple time; and a fourth beat motion of quadruple time corresponds to the third beat motion of triple time. A second beat motion of quadruple time is a swing motion by which the conductor swings the baton to the left from an end position of the first beat motion. Further, a location of a beating point depends on a method of performance. Specifically, the non legato of FIG. 3A and legato of FIG. 3B show that a beating point appears in the middle of the second beat motion, whilst the staccato of FIGS. 3A and 3B shows that a beating point is placed at a left end of the second beat motion.

As shown in FIGS. 4A to 4D, motions to indicate beats of duple time are up/down motions by which the conductor swings the baton up and down. In the case of non legato of FIG. 4A, legato of FIG. 4B and strong staccato of FIG. 4D, a first beat motion of duple time consists of a swing-down motion, by which the conductor swings down the baton from an upper position to a lower position, and a short swing-up motion which occurs on the rebound. In the first beat motion, a lower end of the swing-down motion corresponds to a beating point. A second beat motion of duple time consists of a short preparation motion, which is a short swing-down motion by which the conductor swings down the baton in a short interval of distance for preparation, and a swing-up motion by which the conductor swings up the baton from a lower position to an upper position (i.e., a start position of the first beat motion). Herein, a lower end of the short swingdown motion corresponds to a beating point of the second beat motion.

Figure 5A:
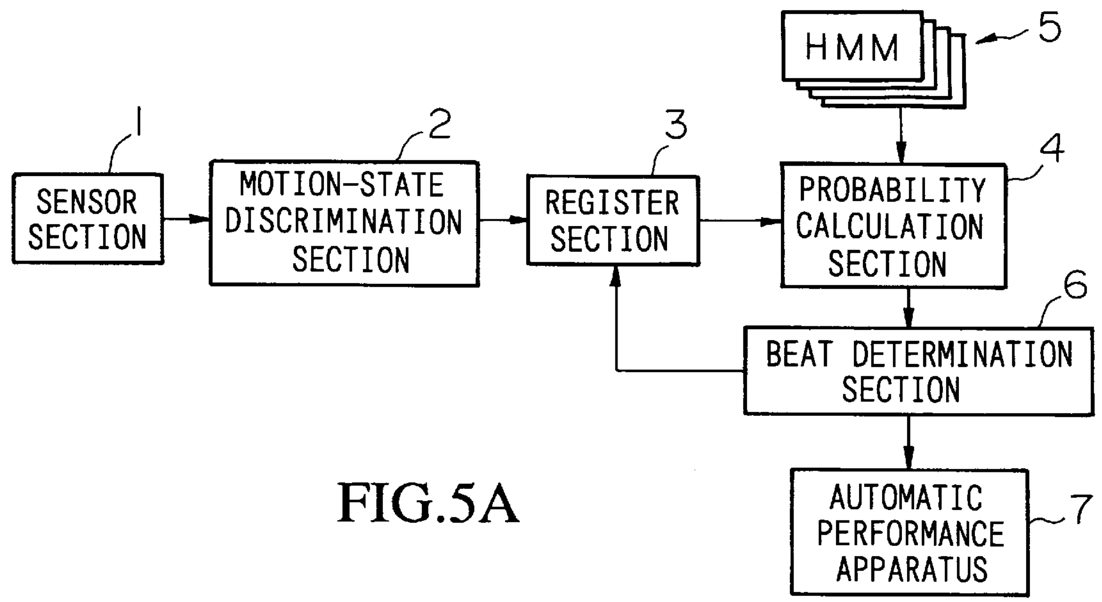
FIG. 5A is a block diagram showing a conducting operation analyzing device which is designed in accordance with an embodiment of the invention.
Figure 5B:
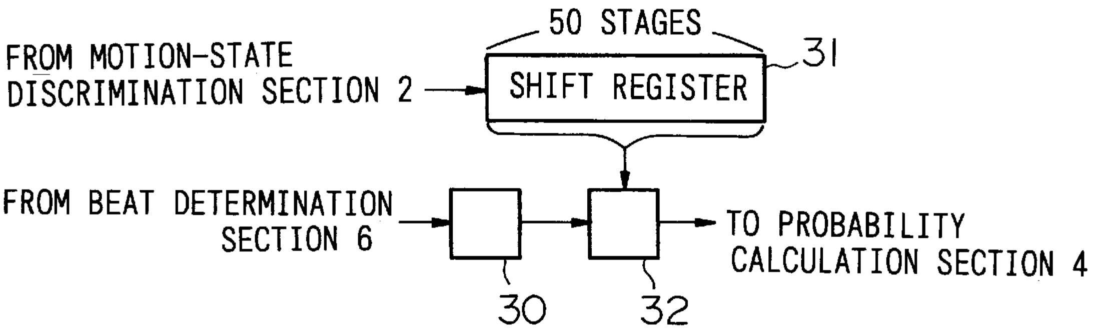
FIG. 5B is a block diagram showing an example of an internal configuration of a register section shown in FIG. 5A.
Figure 5C:
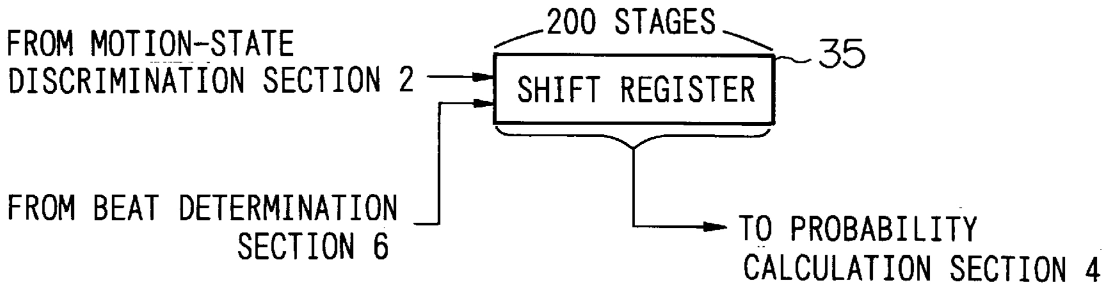
FIG. 5C is a block diagram showing another example of the internal configuration of the register section.
Figures 7A, 7B:
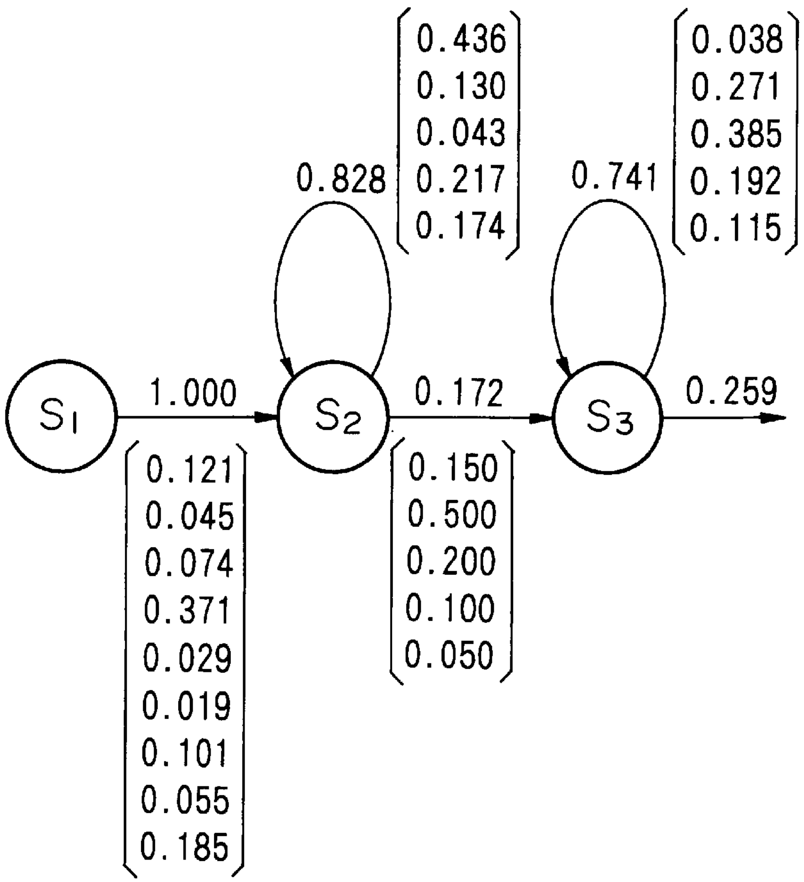
FIG. 7A shows a list of HMMs which are stored in a HMM storage section shown in FIG. 5A.
FIG. 7B is a state transition diagram showing an example of a HMM which learns label series regarding a first beat of quadruple time.
Figure 7C:
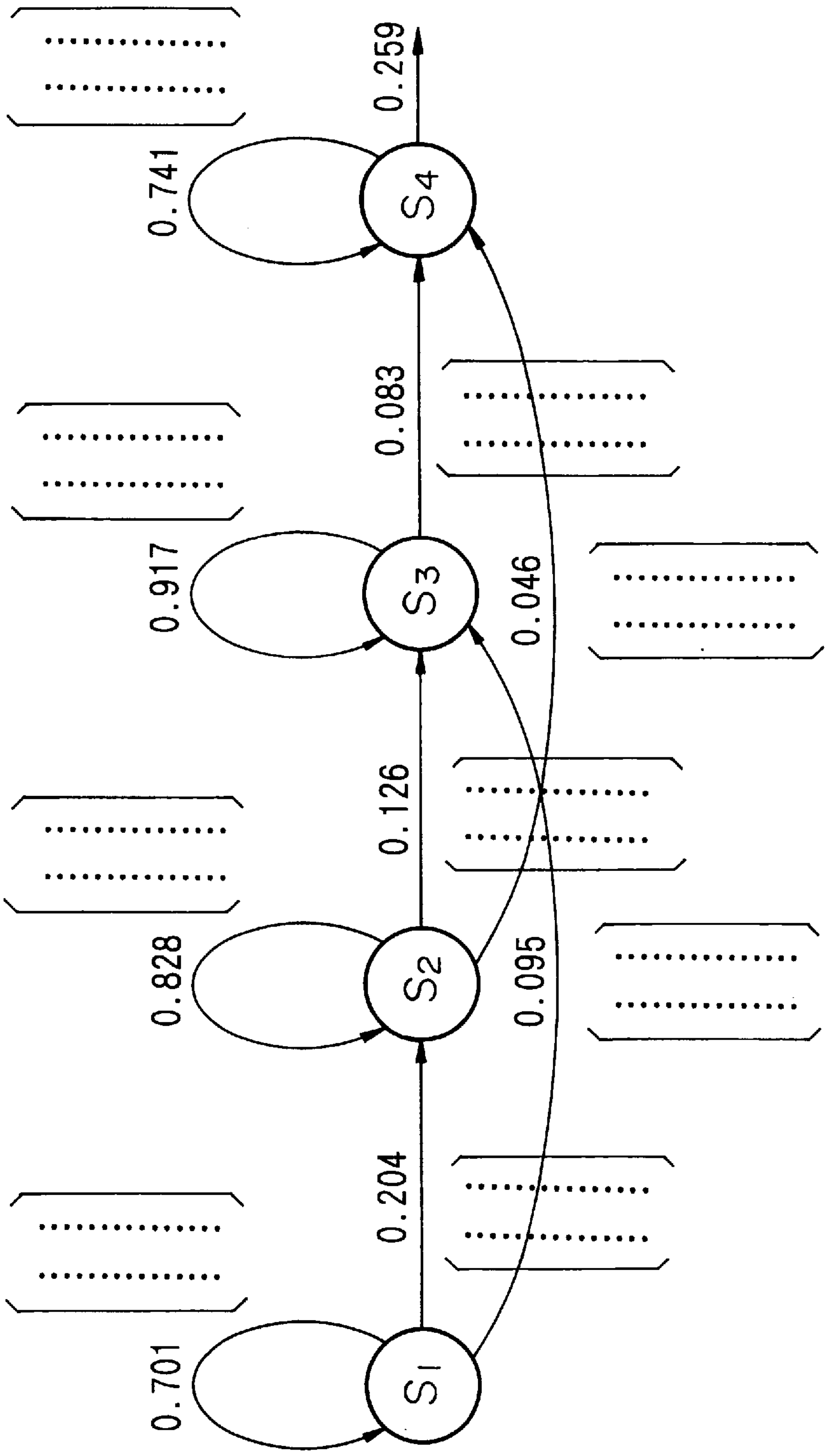
FIG. 7C Is a state transition diagram showing another example of the HMM.

FIGS. 5A to 5C show an example of a conducting operation analyzing device which performs analysis, using the aforementioned system of the HMM, on the content of the conducting method by analyzing the swing motions of the baton. FIGS. 6A and 6B are used to explain the content of operation of a motion-state-discrimination section of the conducting operation analyzing device. In addition, FIGS. 7A to 7C are used to show examples of HMMs which are stored in a HMM storage section of the conducting operation analyzing device.

The conducting operation analyzing device is configured by a sensor section 1, a motion-state-discrimination section 2, a register section 3, a probability calculation section 4, a HMM storage section 5 and a beat determination section 6. Result of the determination made by the beat determination section 6 is inputted to an automatic performance apparatus 7. The sensor section 1 corresponds to sensors which are built in a controller. The controller is grasped by a hand of a human operator and is swung in accordance with a certain conducting method, so that the sensors detect angular velocities and acceleration applied thereto. In general, the controller has a baton-like shape which can be swung in accordance with a conducting method. Other than such a baton-like shape, the controller can be designed in a hand-grip-like shape. Or, the controller can be designed such that a piece (or pieces) thereof is directly attached to a hand (or hands) of the human operator. Detection values outputted from the sensor section 1 are inputted to the motion-state-discrimination section 2.

Now, regions of swing velocities (or angular velocities) are determined based on outputs of multiple sensors. FIG. 6A shows an example of regions which are partitioned in response to swing directions of a baton. For example, the baton can incorporate a vertical-direction sensor and a horizontal-direction sensor which detect swing motions in vertical and horizontal directions respectively. So, the regions can be determined based on results of analysis which is performed on output values of the vertical-direction sensor and output values of the horizontal-direction sensor. Incidentally, details of the baton which incorporates the vertical-direction sensor and horizontal-direction sensor is explained by the paper of U.S. patent application No. 08/643,851 whose content has not been published, for example.

The motion-state-discrimination section 2 is designed to perform a variety of operations, as follows:

(1) An output of the sensor section 1 is divided into frames each corresponding to a time unit of 10 ms.

(2) Discrimination is made as to a region to which a swing velocity (or angular velocity) belongs. Labels (e.g., operation labels $\mathbf{1}_1$ to $\mathbf{1}_5$) are allocated to frames in response to partitions shown in FIG. 6A.

(3) The labels are inputted to the register section 3. The inputting operation is repeatedly executed by a time unit of 10 ms corresponding to a frame clock.

Incidentally, FIG. BB shows a label list, wherein numerals $\mathbf{1}_6$ to $\mathbf{1}_{14}$ designate beat labels.

Further, FIG. 6A merely shows an example of a label partitioning process, so the invention is not limited to such an example. In general, a sensor output corresponding to an input operation differs with respect to a variety of elements such as a sensing system (i.e., kinds of the controller and sensors), human operator, and a method to grasp the controller. So, in order to improve a precision of a label allocating process in accordance with the aforementioned elements, it is necessary to collect a large amount of data which represent beat designating operations with respect to a variety of manners which correspond to multiple human operators and multiple methods to grasp the controller, for example. So, a representative point is determined with respect to data regarding similar beat designating operations. Thus, a label allocating process is performed with respect to the representative point.

FIG. 5B shows an example of a configuration of the register section 3. The register section 3 is configured by a beat label register 30, a shift register 31 and a mixing section 32. Herein, the beat label register 30 stores beat determination information (i.e., beat labels) which is produced by the motion-state-discrimination section 2. The shift register 31 has 50-stages construction which is capable of storing 50 operation labels outputted from the motion-state-discrimination section 2.

The mixing section 32 concatenates the beat labels and operation labels together, so that the concatenated labels are inputted to the probability calculation section 4. The shift register 31 shifts the stored content thereof by a frame clock of 10 ms. As a result, the shift register 31 stores 50 operation labels including a newest one; in other words, the shift register 31 stores a number of operation labels which correspond to a time unit of 500 ms.

As described above, the register section 3 is designed in such a way that the beat labels and operation labels are stored independently of each other. In addition, those labels are concatenated together such that the beat label should be placed at a top position of the label series. Reasons why the beat labels and operation labels should be stored independently of each other will be described below.

If a length of storage of the shift register 31 is longer than a 1-beat length, the stored content of the shift register 31 must include operation labels regarding a previous beating operation in addition to operation labels regarding a current beating operation. This makes the analysis complex. In order to avoid such a complexity, the length of storage of the shift register 31 is limited to a length corresponding to the time unit of 500 ms. However, if the beat labels are inputted to the shift register 31 in a time-series manner as similar to the inputting of the operation labels, there is a probability that the beat labels have been already shifted out from the shift register 31 at a next beat timing. Thus, the beat labels are stored independently of the operation labels.

However, the register section 3 can be configured by a shift register 35 of FIG. 5C, a length of storage of which is sufficiently longer than the 1-beat length. Thus, as similar to the inputting of the operation labels, the beat labels are inputted to the shift register 35 in a time-series manner, so that beat labels regarding a previous beat as well as operation labels regarding a previous beating operation are contained in label series. In this case, the analysis should be complex. However, the analysis is made on a previous beating operation as well as a current beating operation, so that a beat kind (i.e., a kind of a beat which represents one of first, second and third beats, for example) is discriminated with accuracy.

The invention is not limited to the present embodiment with respect to a number of stages of the shift register and a frequency of frame clocks.

The probability calculation section 4 performs calculations with respect to all the HMMs stored in the HMM storage section 5. Herein, the probability calculation section 4 calculates a probability that each HMM outputs label series of 51 labels (e.g., a beat label and 50 operation labels) which are inputted thereto from the register section 3. The HMM storage section 5 stores multiple HMMs which output a variety of label series with respect to beating operations. Examples of the label series are shown in FIG. 7A. Herein, each label series is represented by a numeral 'M' to which two digits are suffixed, wherein a left-side digit represents a kind of time in music (e.g., '4' in case of quadruple time), whilst a right-side digit represents a number of a beat (e.g., '1' in case of a first beat). So, '$M_{41}$' represents label series regarding a first beat of quadruple time, for example. Now, the HMMs are provided to represent time-varying states of the conducting operations, which are objects to be recognized, in a finite number of state-transition probabilities. Each HMM is constructed by 3 or 4 states having a self-transition path (or self-transition paths). So, the HMM uses the learning to determine a state-transition probability as well as an output probability regarding each label. The probability calculated by the probability calculation section 4 is supplied to the beat determination section 6.

FIGS. 7B and 7C show examples of construction of a HMM (denoted by '$M_{41}$') which is constructed by the learning of a first beat of quadruple time. Specifically, FIG. 7B shows an example of construction of the HMM which is provided when the register section 3, having the construction of FIG. 5B, outputs label series in which a beat label is certainly placed at a top position, whilst FIG. 7C shows an example of construction of the HMM which is provided when the register section 3, having the construction of FIG>5C, outputs label series which are constructed by operation labels regarding a previous beating operation, its beat label, and operation labels regarding a current beating operation.

In case of the HMM of FIG. 7B, only one beat label is provided and is placed at a top position of the label series. So, a state transition from a state $S_1$ to a state $S_2$ certainly occurs with a probability of '1'. At this time, the HMM outputs one of the beat labels $\mathbf{1}_6$ to $\mathbf{1}_{14}$. At the state $S_2$ or at a state S3, the HMM outputs the operation labels $\mathbf{1}_1$ to $\mathbf{1}_5$ only.

In case of the HMM of FIG. 7C, 4 states are required to perform analysis on the operation labels regarding the previous beating operation, its beat label, and operation labels regarding the current beating operation. So, there is a probability that the HMM outputs all the labels $\mathbf{1}_1$ to $\mathbf{1}_{14}$ in all transition events (including self-transition events).

Incidentally, the construction of the HMM is not limited to the above examples of FIGS. 7B and 7C.

The beat determination section 6 performs comparison on probabilities, respectively outputted from the HMMs, to extract a highest probability. Then, the beat determination section 6 makes a determination such that a beat timing exists if the highest probability exceeds a certain threshold value. At this time, a beat (e.g., its kind or its number) is determined as a beat kind corresponding to the HMM which outputs the highest probability. In contrast, if the highest probability does not exceed the certain threshold value, the beat determination section 6 does not detect existence of a beat timing, so the beat determination section 6 does not output data.

A series of operations described above can be summarized as follows:

At each frame timing, the register section 3 outputs label series of 51 labels to the probability calculation section 4, regardless of a beat timing. Based on the label series, the probability calculation section 4 outputs a probability of each HMM at each frame timing. Thus, all the probabilities of the HMMs are inputted to the beat determination section 6, regardless of the beat timing. In general, however, probabilities, which are inputted to the beat determination section 6 in connection with label series regarding beat timings, are different from probabilities, which are inputted to the beat determination section 6 in connection with label series regarding non-beat timings other than the beat timings, in absolute values of probabilities. For this reason, an appropriate threshold value is set and is used as a criterion to discriminate the beat timings and non-beat timings. If the probability is lower than the threshold value, the beat determination section 6 determines that its timing is not a beat timing. Further, the beat determination section 6 is capable of detecting a beat timing in synchronization with determination of a beat kind based on the HMM which outputs the highest probability.

Now, the beat determination section 6 determines a beat timing as well as a beat kind. Then, the beat determination section 6 outputs beat-kind information to the automatic performance apparatus 7. Thus, the automatic performance apparatus 7 controls a tempo of performance in such a way that beat timings and beat kinds of the performance currently played will coincide with beat timings and beat kinds which are inputted thereto from the beat determination section 6. Moreover, the beat determination section 6 produces a beat label (e.g., $\mathbf{1}_6$ to $\mathbf{1}_{14}$) corresponding to the beat kind. The beat label is inputted to the register section 3. So, the beat label is stored in the beat-label register 30 of the register section 3.

As a result, the conducting operation analyzing device of the present embodiment is capable of controlling the automatic performance apparatus 7 by detecting beat designating operations made by conducting of a human operator. According to the present embodiment, this device is designed such that result of determination made by the beat determination section 6 is converted into a beat label which is supplied to the register section 3 and is stored in a specific register different from a shift register used to store operation labels. However, the present embodiment can be modified such that like the operation labels, the beat labels are sequentially stored in a shift register in an order corresponding to generation timings thereof.

Incidentally, the HMMs stored in the HMM storage section 5 can be subjected to the advanced learning so that recognition work thereof will be improved. For example, the content of the learning can be expressed with respect to label series 'L', which are provided for a certain operation which is represented by a Hidden Markov Model 'M', as follows:

The learning is defined as adjustment of parameters (i.e., transition probabilities and output probabilities) of the Hidden Markov Model M in such a manner that a probability 'Pr(L:M)' of the Hidden Markov Model M is maximized with respect to the label series L.

There are provided a variety of methods for the learning, as follows:

(1) Customization for a specific individual user: or a method to re-calculate representative points based on data used by the individual user only.

(2) Generalization: or a method to re-calculate representative points by collecting data from a more number of persons.

(3) Fine tuning in progression of performance: or a method to perform fine adjustment on representative values periodically if data used by a performer are normally shifting from representative values which are preset for labels.

The learning is completed in convergence which is made by repeating calculations based on data, wherein appropriate initial values are applied to the parameters.

Now, the modeling of the conducting method using the HMMs can be achieved by a variety of methods to determine elements such as labels, kinds of parameters to be treated, and construction of the HMM. So, the present embodiment merely shows one method for the modeling of the conducting method.

By the way, it is possible to increase a number of parameters to be treated and a number of labels to be used. In that case, it is possible to increase kinds of motions (or operations) to be recognized and kinds of music information, or it is possible to improve a recognition rate. For example, it is possible to recognize dynamics based on a stroke of a motion and its speed. Or, it is possible to recognize a manner of performance designated by a human operator, such as legato and staccato, by referring to a curvature regarding a locus of a motion within a two-dimensional plane. That is, if a human operator makes a smooth motion, in other words, if a locus of a motion has a small curvature at a point to perform beating, it is possible to detect designation of legato (or slur or espressivo). On the other hand, if the human operator makes a 'clear' motion, in other words, if a locus of a motion has a large curvature, it is possible to detect designation of staccato.

The embodiment uses directions and velocities (i.e., angular velocities) of swing motions as parameters which are used for the label process. However, it is possible to compute main directional components of swing motions by analyzing a shape of a locus which a human operator performs conducting (or a human operator designates beats). In this case, it is possible to perform conversion in such a way that an axis of a first directional component coincides with a vertical direction, whilst an axis of a second directional component coincides with a horizontal direction. This conversion is effective to reduce complicated elements regarding differences between manners to hold a baton by different persons and habits of the persons.

Other than the directions and velocities (i.e., angular velocities) of the swing motions, it is possible to employ a variety of parameters, as follows:

(1) Angles, positions, velocities, acceleration, etc. which are measured with respect to a reference point (or reference points) in a two-dimensional plane or in a three-dimensional space.

(2) Peaks, bottoms, absolute values, etc., regarding time regions of a waveform.

(3) Kinds of previous beats.

(4) Differences (e.g., angles, velocities and positions) measured from previous beating points (or previous beat timings).

(5) Amounts of time measured from previous beat timings.

(6) Differences detected from previous samples of waveform.

(7) Quadrant observed from a center of motion.

It is possible to selectively use one of the above parameters. Or, it is possible to use combination of the parameters arbitrarily selected from among the above parameters. Further, it is possible to perform cluster analysis on spatial deviation of multiple parameters, so that representative vectors are computed and are used as labels.

The conducting operation analyzing device of the present embodiment is designed based on a recognition method of a certain level of hierarchy to recognize beat timings and beat kinds. The device can be modified based on another recognition method of a higher level of hierarchy, wherein the HMMs are applied to beat analysis considering a chain of beat kinds. For example, a recognition is made such that, now, if beat kinds have been changed in an order of the second beat, third beat and first beat, the device makes an assumption that a third beat is to be played currently. In this case, by introducing Null transition to the device, wherein the Null transition enables state transitions without outputting labels, it is possible to recognize beats without requiring a human operator to designate all of the beats. For example, if the device allows a Null transition from a first beat to a third beat in a HMM which is used for recognition of beats in triple time, it is possible to recognize designation of triple time without requiring a human operator to designate a second beat.

As described heretofore, the present embodiment relates to an application of the invention to the conducting operation analyzing device which is provided to control a tempo of automatic performance, for example. Herein, the conducting operations are series of continuous motions which are repeatedly carried out in a time-series manner based on certain rules. So, determination of a structure of a HMM and learning of a HMM are easily accomplished with respect to the above conducting operations. Therefore, it is expected to provide a high precision of determination for the conducting operations.

By the way, the device shown by FIGS. 5A to 5C can be applied to a variety of fields which are not limited to determination of the conducting operations. That is, the device can be applied to a variety of fields in determination of motions of human operators as well as movements of objects, for example. In addition, the device can be applied to multi-media interfaces; for example, the device can be applied to an interface for motions which are realized by virtual reality. As sensors used for the virtual reality, it is possible to use three-dimensional position sensors and angle sensors which detect positions and angles in a three-dimensional space, as well as sensors of a glove type or sensors of a suit type which detect bending angles of joints of fingers of human operators. Further, the device is capable of recognizing motion pictures which are taken by a camera. FIGS. 8A and 8B show relationship between labels and HMMs with respect to the case where the device of the present embodiment is applied to a game. Specifically, FIG. 8A shows a label list containing labels $\mathbf{1}_1$ to $\mathbf{1}_{14}$, whilst FIG. 8B shows the contents of motions, to be recognized by HMMs, with the contents of label series. Herein, the aforementioned sensors detect motions of a game, which are then subjected to label process to create labels shown in FIG. 8A. Then, the device determines kinds of the motions, which are made in the game, by the HMMs (see FIG. 8B) which have learned time transitions of the labels. For example, a punching motion (namely, a 'punch') is recognized as a series of three states, as follows:

i) A state to clench a fist (i.e., label $\mathbf{1}_8$);

ii) A state to start stretching an elbow (i.e., label $\mathbf{1}_2$); and iii) A state that the elbow is completely stretched (i.e., label 14).

So, a $HMM_1$ performs learning to output a high probability with respect to label series containing labels which correspond to the above states.

Moreover, the device of the present embodiment can be applied to recognition of sign language. In this case, a camera or a data-entry glove is used to detect bending states of fingers and positions of hands. Then, results of the detection are subjected to label process to create labels which are shown in FIG. 9A, for example. Based on label series consisting of the labels, a HMM is used to recognize a word expressed by sign language. Incidentally, kinds of the detection used for the recognition of sign language are not limited to the detection of the bending states of the fingers and positions of hands. So, it is possible to perform recognition of sign language based on results of the detection of relatively large motions expressed by a body of a human operator.

Incidentally, methods to recognize motions are not limited to the aforementioned method using the HMMs. So, it may be possible to use a fuzzy inference control or a neural network for recognition of the motions. However, the fuzzy inference control requires 'complete description' to describe all rules for detection and discrimination of the motions. In contrast, the HMM does not require such a description of rules. Because, the HMM is capable of learning the rules for recognition of the motions. Therefore, the HMM has an advantage that the system thereof can be constructed with ease. Further, the neural network requires very complicated calculations to perform learning. In contrast, the HMM is capable of performing learning with simple calculations. In short, the learning can be made easily in the HMM. For the reasons described above, as compared to the fuzzy inference control and neural network, the HMM is more effective in recognition of the motions.

Furthermore, as compared to the fuzzy inference control and neural network, the HMM is capable of accurately reflecting fluctuations of the motions to the system thereof. This is because the output probabilities may correspond to fluctuations of values to be generated, whilst the transition probabilities may correspond to fluctuations with respect to an axis of time. In addition, the structure of the HMM is relatively simple. Therefore, the HMM can be developed to cope with the statistical theory, information theory and the like. Further, the HMMs can be assembled together to enable recognition of an upper level of hierarchy based on the concept of probabilities.

Incidentally, the present embodiment is designed to use a single baton. Therefore, beat timings and beat kinds are detected based on swing motions of the baton, so that the detection values thereof are used to control a tempo of automatic performance. However, it is possible to provide a plurality of batons. In that case, multiple kinds of music operations and music information are detected based on motions imparted to the batons, so the detection values thereof are used to control a variety of music elements. For example, a human operator can manipulate two batons by right and left hands respectively. Thus, the human operator is capable of controlling a tempo and dynamics by manipulating a right-hand baton and is also capable of controlling other music elements or music expressions by manipulating a left-hand baton.

Figure 10:
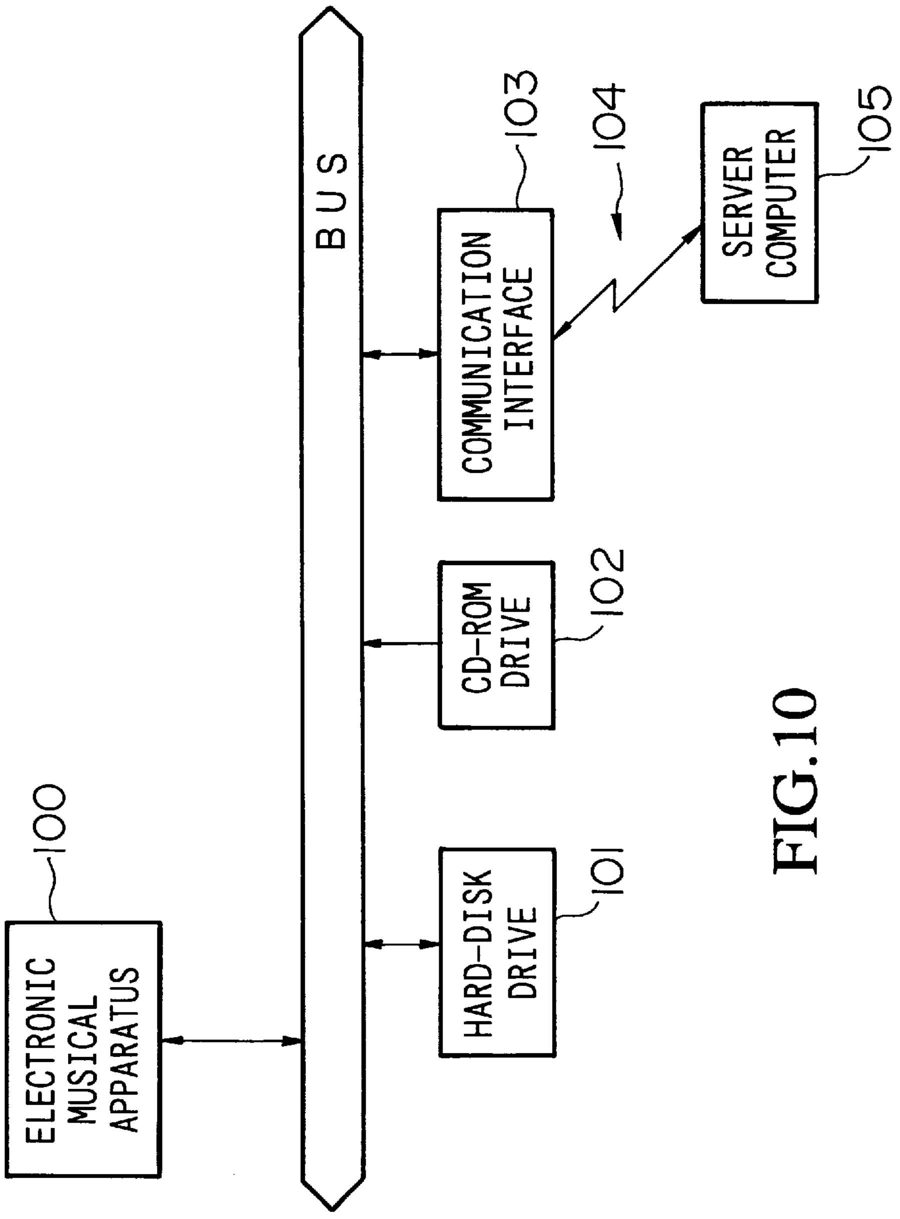
FIG. 10 is a block diagram showing an overall system which contains an electronic musical apparatus having functions of the conducting operation analyzing device.

Lastly, applicability of the invention can be extended in a variety of manners. For example, FIG. 10 shows a system containing an electronic musical apparatus 100 which incorporates the aforementioned conducting operation analyzing device of FIG. 5A or which is interconnected with the device of FIG. 5A. Now, the electronic musical apparatus 100 is connected to a hard-disk drive 101, a CD-ROM drive 102 and a communication interface 103 through a bus. Herein, the hard-disk drive 101 provides a hard disk which stores operation programs as well as a variety of data such as automatic performance data and chord progression data. If a ROM of the electronic musical apparatus 100 does not store the operation programs, the hard disk of the hard-disk drive 101 stores the operation programs which are transferred to a RAM on demand so that a CPU of the apparatus 100 can execute the operation programs. If the hard disk of the hard-disk drive 101 stores the operation programs, it is possible to easily add, change or modify the operation programs to cope with a change of a version of the software.

In addition, the operation programs and a variety of data can be recorded in a CD-ROM, so that they are read out from the CD-ROM by the CD-ROM drive 102 and are stored in the hard disk of the hard-disk drive 101. Other than the CD-ROM drive 102, it is possible to employ any kinds of external storage devices such as a floppy-disk drive and a magneto-optic drive (i.e., MO drive).

The communication interface 103 is connected to a communication network 104 such as a local area network (i.e., LAN), a computer network such as 'internet' or telephone lines. The communication network 104 also connects with a server computer 105. So, programs and data can be downloaded to the electronic musical apparatus 100 from the server computer 105. Herein, the system issues commands to request 'download' of the programs and data from the server computer 105; thereafter, the programs and data are transferred to the system and are stored in the hard disk of the hard-disk drive 101.

Moreover, the present invention can be realized by a 'general' personal computer which installs the operation programs and a variety of data which accomplish functions of the invention such as functions to analyze the swing motion of the baton by the HMMs. In such a case, it is possible to provide a user with the operation programs and data pre-stored in a storage medium such as a CD-ROM and floppy disks which can be accessed by the personal computer. If the personal computer is connected to the communication network, it is possible to provide a user with the operation programs and data which are transferred to the personal computer through the communication network.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. A motion discrimination method comprising the steps of:

detecting a motion by a sensor to produce detection values;

converting the detection values to labels by a certain time unit so as to create label series corresponding to the detected motion;

performing calculations to produce a probability that at least one of Hidden Markov Models outputs the label series corresponding to the detected motion, wherein each of the Hidden Markov Models is constructed to learn specific label series regarding a specific motion; and discriminating a kind of the detected motion, detected by the sensor, on the basis of result of the calculations.

2. A motion discrimination method according to claim 1 further comprising the steps of:

producing a specific label based on the discriminated kind of the motion; and inserting the specific label into the label series.

3. A motion discrimination method comprising the steps of:

detecting a motion made by a human operator to produce detection values;

creating labels based on the detection values, so that the labels are assembled together by a unit time to form label series corresponding to the detected motion;

providing a plurality of Hidden Markov Models each of which is constructed to learn specific label series regarding a specific motion;

performing calculations to produce a probability that at least one of the plurality of Hidden Markov Models outputs the label series corresponding to the detected motion; and discriminating a kind of the detected motion based on result of the calculations.

4. A motion discrimination method according to claim 3 wherein the motion corresponds to one of a series of conducting operations which are made by a human operator to swing a baton to conduct music of a certain time, so that the label series consists of operation labels.

5. A motion discrimination method according to claim 3 wherein the motion corresponds to one of a series of conducting operations which are made by a human operator to swing a baton to conduct music of a certain time, so that the label series is constructed by operation labels accompanied with a beat label representing the discriminated kind of the motion.

6. A motion discrimination method according to claim 3 wherein the calculations are performed to produce probabilities that multiple Hidden Markov Models respectively output the label series corresponding to the detected motion, so that the kind of the detected motion is discriminated as a motion corresponding to a Hidden Markov Model having a highest one of the probabilities within the multiple Hidden Markov Models only when the highest one of the probabilities exceeds a certain threshold value.

7. A motion discrimination device comprising:

sensor means for detecting a motion to produce detection values;

labeling means for converting the detection values to labels by a certain time unit;

label-series creating means for creating label series consisting of the labels which are outputted from the labeling means by the certain time unit;

Hidden-Markov-Model storage means for storing a plurality of Hidden Markov Models each of which is constructed to learn specific label series corresponding to a specific motion;

calculation means for performing calculations to obtain a probability that at least one of Hidden Markov Models outputs the label series; and discrimination means for discriminating a kind of the detected motion, detected by the sensor means, on the basis of result of the calculations.

8. A motion discrimination device according to claim 7 wherein the label-series creating means is constructed such that a specific label, representing the discriminated kind of the motion by the discrimination means, is inserted into the label series.

9. A motion discrimination device comprising:

sensor means for detecting a motion made by a human operator to produce detection values;

labeling means for creating labels based on the detection values;

label-series creating means for creating label series corresponding to the detected motion, wherein the label series contains the labels which are supplied thereto from the labeling means by a time unit which is determined in advance;

a plurality of Hidden Markov Models, each of which is constructed to learn specific label series corresponding to a specific motion;

probability calculating means for performing calculations to produce a probability that at least one of the plurality of Hidden Markov Models outputs the label series corresponding to the detected motion; and discrimination means for discriminating a kind of the detected motion based on result of the calculations.

10. A motion discrimination device according to claim 9 wherein the motion corresponds to one of a series of conducting operations which are made by the human operator to swing a baton to conduct music of a certain time, so that the label series consists of operation labels.

11. A motion discrimination device according to claim 9 wherein the motion corresponds to one of a series of conducting operations which are made by the human operator to swing a baton to conduct music of a certain time, so that the label series is constructed by operation labels accompanied with a beat label representing the discriminated kind of the motion.

12. A motion discrimination device according to claim 9 wherein the calculations are performed to produce probabilities that multiple Hidden Markov Models output the label series corresponding to the detected motion, so that the kind of the detected motion is discriminated as a motion corresponding to a Hidden Markov Model having a highest one of the probabilities within the multiple Hidden Markov Models only when the highest one of the probabilities exceeds a certain threshold value.

13. A motion discrimination device according to claim 9 wherein the motion corresponds to one of a series of conducting operations which are made by the human operator to swing a baton to conduct music of a certain time, so that the label-series creating means is constructed by first storage means to store operation labels and second storage means to store a beat label representing the discriminated kind of the motion.

14. A motion discrimination device according to claim 9 wherein each of the plurality of Hidden Markov Models is realized by a plurality of state transitions, each of which occurs from one state to another with a probability.

15. A motion discrimination device according to claim 9 wherein each of the plurality of Hidden Markov Models is realized by a plurality of state transitions, each of which occurs from one state to another with a probability, as well as at least one self state transition in which a system remains at a same state with a probability.

16. A motion discrimination device according to claim 9 wherein each of the plurality of Hidden Markov Models is constructed to learn one of beats of the certain time.

17. A storage device storing programs and data which cause an electronic apparatus to execute a motion discrimination method comprising the steps of:

detecting a motion made by a human operator to produce detection values;

creating labels based on the detection values, so that the labels are assembled together by a unit time to form label series corresponding to the detected motion;

providing a plurality of Hidden Markov Models each of which is constructed to learn specific label series regarding a specific motion;

performing calculations to produce a probability that at least one of the plurality of Hidden Markov Models outputs the label series corresponding to the detected motion; and discriminating a kind of detected motion based on result of the calculations.

18. A storage device according to claim 17 wherein the motion corresponds to one of a series of conducting operations which are made by a human operator to swing a baton to conduct music of a certain time, so that the label series consists of operation labels.

19. A storage device according to claim 17 wherein the motion corresponds to one of a series of conducting operations which are made by a human operator to swing a baton to conduct music of a certain time, so that the label series is constructed by operation labels accompanied with a beat label representing the discriminated kind of the motion.

20. A storage device according to claim 17 wherein the calculations are performed to produce probabilities that multiple Hidden Markov Models respectively output the label series corresponding to the detected motion, so that the kind of the detected motion is discriminated as a motion corresponding to a Hidden Markov Model having a highest one of the probabilities within the multiple Hidden Markov Models only when the highest one of the probabilities exceeds a certain threshold value.

21. A machine-readable medium storing program instructions for controlling a machine to perform a method including a plurality of steps, creating a label series comprising labels which are created by detecting a specific motion made by a human operator; and performing a plurality of calculations corresponding to each of a plurality of Hidden Markov Models to determine the most appropriate Hidden Markov Model to represent the label series. wherein each of the Hidden Markov Models is represented by a series of state transitions which occur among a series of states with associated probabilities.

22. A storage medium according to claim 21 wherein the labels are created by detecting a specific motion which corresponds to beats of a certain time of music.

* * * * *